US008310519B2

(12) United States Patent
Valenzuela et al.

(10) Patent No.: US 8,310,519 B2
(45) Date of Patent: Nov. 13, 2012

(54) DEVICE FOR CARRYING OUT A VIDEO CONFERENCE

(75) Inventors: Miriam Noemi Valenzuela, Munich (DE); Carlos Alberto Valenzuela, Munich (DE)

(73) Assignee: Valenzuela Holding GmbH, Munich (DE)

( * ) Notice: Subject to any disclaimer, the term of this patent is extended or adjusted under 35 U.S.C. 154(b) by 1370 days.

(21) Appl. No.: 11/908,765

(22) PCT Filed: Mar. 15, 2006

(86) PCT No.: PCT/EP2006/002365
§ 371 (c)(1),
(2), (4) Date: Sep. 14, 2007

(87) PCT Pub. No.: WO2006/097287
PCT Pub. Date: Sep. 21, 2006

(65) Prior Publication Data
US 2008/0192109 A1 Aug. 14, 2008

(30) Foreign Application Priority Data
Mar. 16, 2005 (DE) .......................... 10 2005 012 132

(51) Int. Cl.
*H04N 7/14* (2006.01)
(52) U.S. Cl. .................................. 348/14.08; 348/14.01
(58) Field of Classification Search ..... 348/14.01–14.09
See application file for complete search history.

(56) References Cited

U.S. PATENT DOCUMENTS

| 6,275,258 B1 * | 8/2001 | Chim ..................... 348/211.12 |
| 7,048,386 B2 * | 5/2006 | Buchner ....................... 353/98 |
| 7,119,829 B2 * | 10/2006 | Leonard et al. ............ 348/14.16 |
| 2004/0095460 A1 * | 5/2004 | Buchner et al. ............ 348/14.01 |

FOREIGN PATENT DOCUMENTS
JP 06-351013 A 12/1994

OTHER PUBLICATIONS

International Search Report dated Aug. 10, 2006 from the International Application PCT/EP2006/002365.
Simon J. Gibbs, et al., "Teleport—Towards Immersive Copresence", Multimedia Systems 7: 214-221 (1999).

* cited by examiner

*Primary Examiner* — Curtis Kuntz
*Assistant Examiner* — Sunita Joshi
(74) *Attorney, Agent, or Firm* — Novak Druce + Quigg LLP

(57) ABSTRACT

The invention relates to an assembly for carrying out a video conference between a location A and at least one location W, during which it is possible for at least some participants to make eye-to-eye contact or face-to-face contact. To achieve this, location A is equipped with at least two image generation elements for generating images of the participants in location A, said elements being assigned to different participant positions in location W and is also equipped with at least one optical representation of each participant position in location W. The image generation elements are arranged in such a way that for at least one participant position in location A and at least two representations of participant positions in location W, which are assigned to different image generation elements, the image generation element that is assigned to the respective participant position in location W is positioned within a horizontal angular range of ±20° in relation to the connection lines between the participant position in location A and the representations of the participant positions in location W. Each participant position in location W is assigned the reproduction means that reproduces the image of the image generation element assigned to said participant position.

15 Claims, 11 Drawing Sheets

Fig. 1
Location A
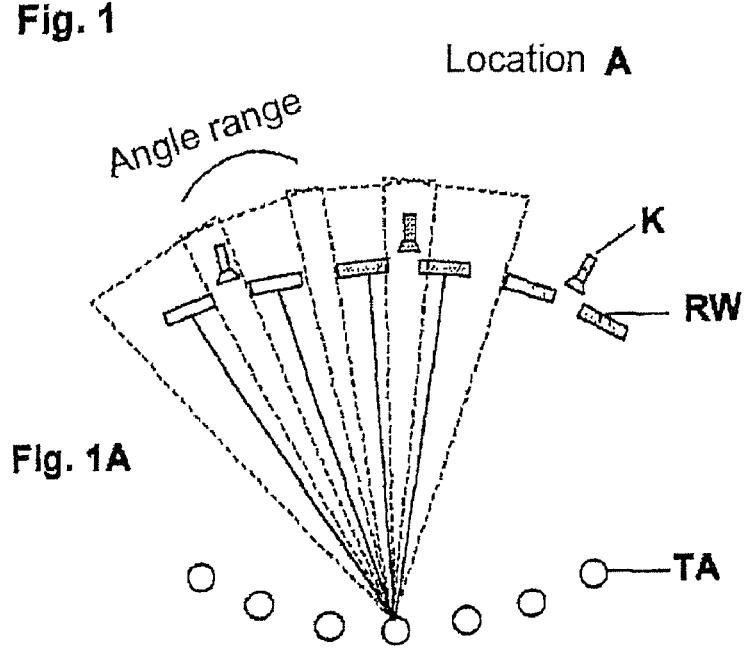
Fig. 1A
Location W (Possibility 1)
Fig. 1B
Location W (Possibility 2)
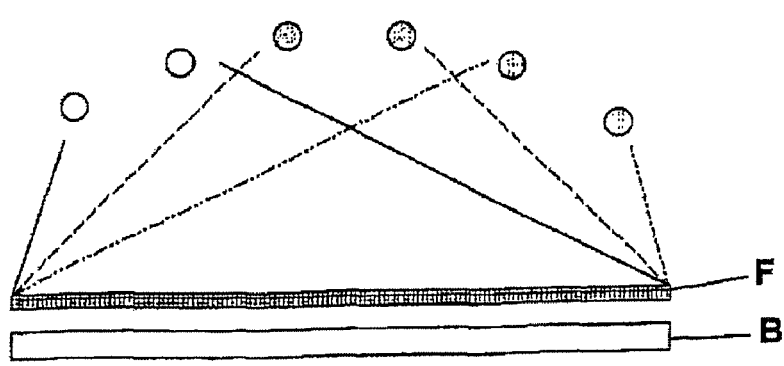
Fig. 1C Fig. 3
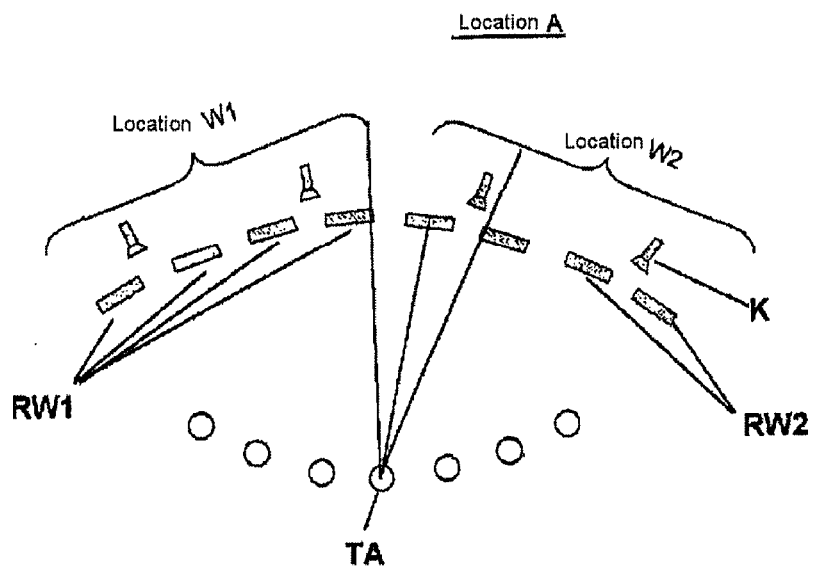
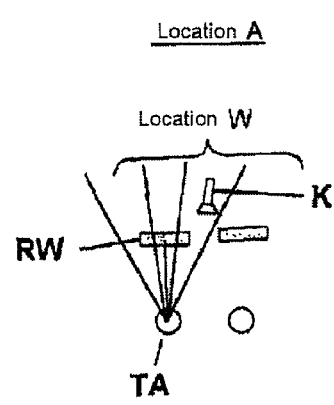
Fig. 4A
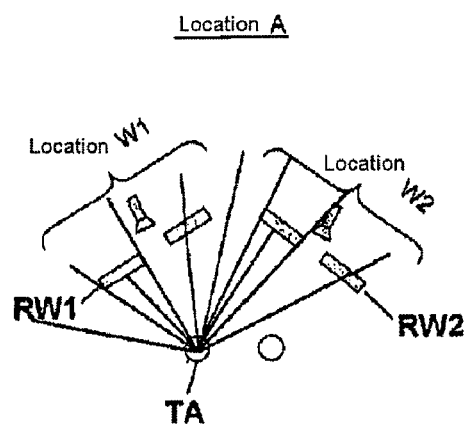
Fig. 4B
Fig. 4

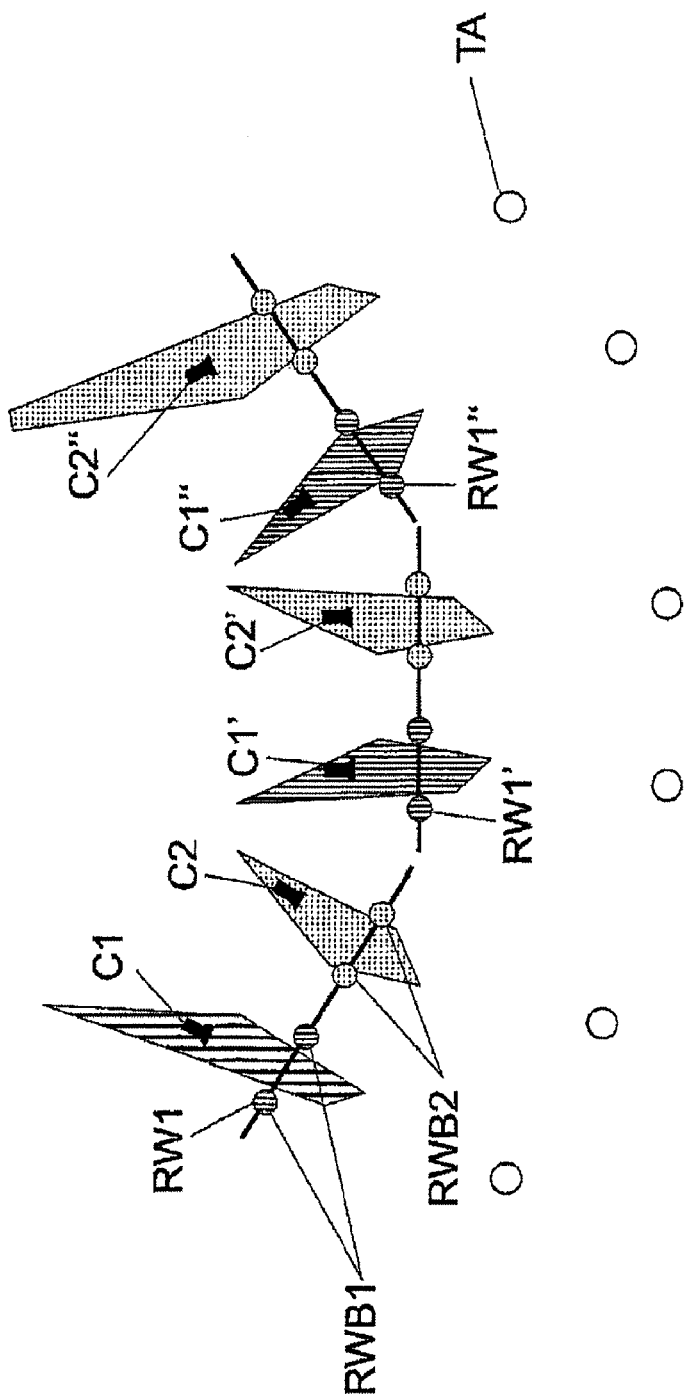

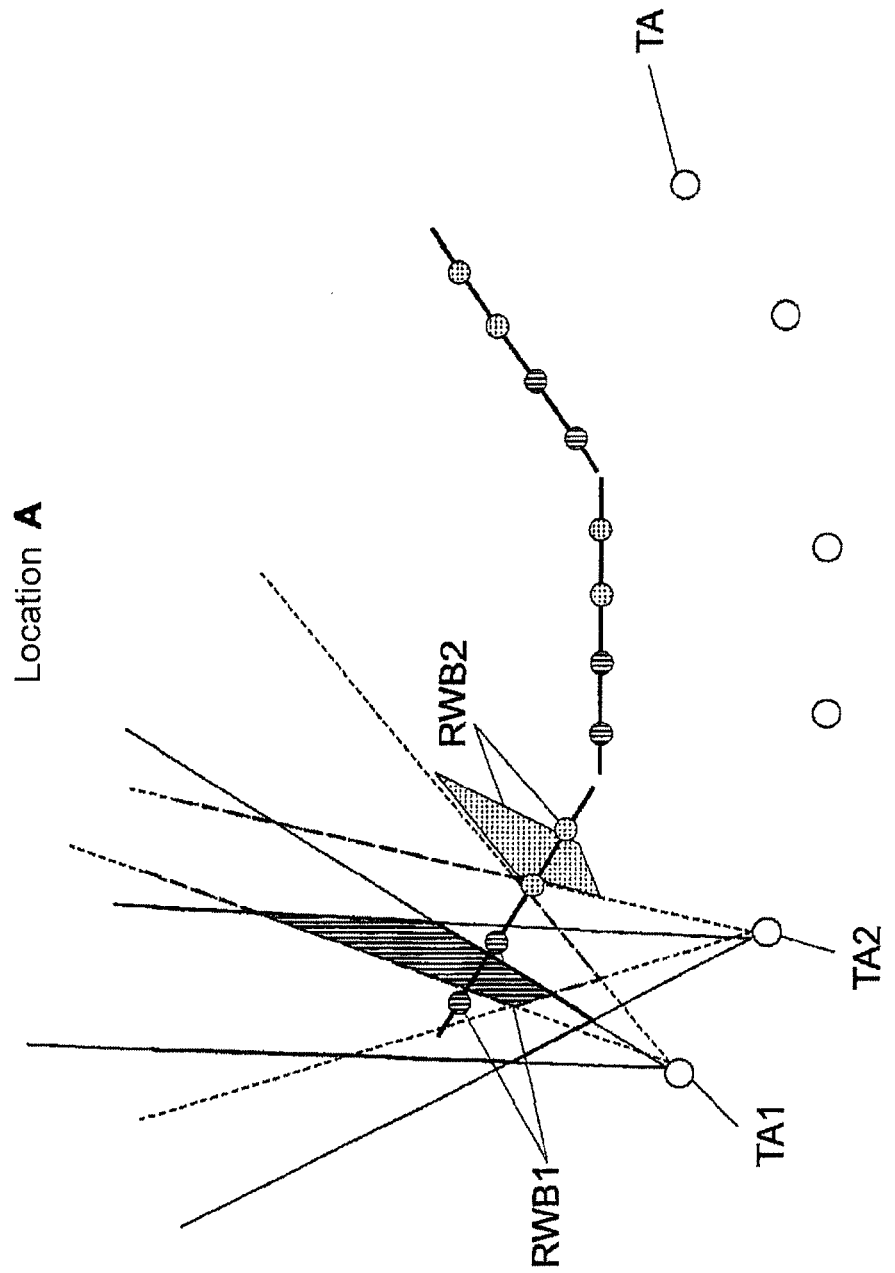

FIG. 7A
Location 1
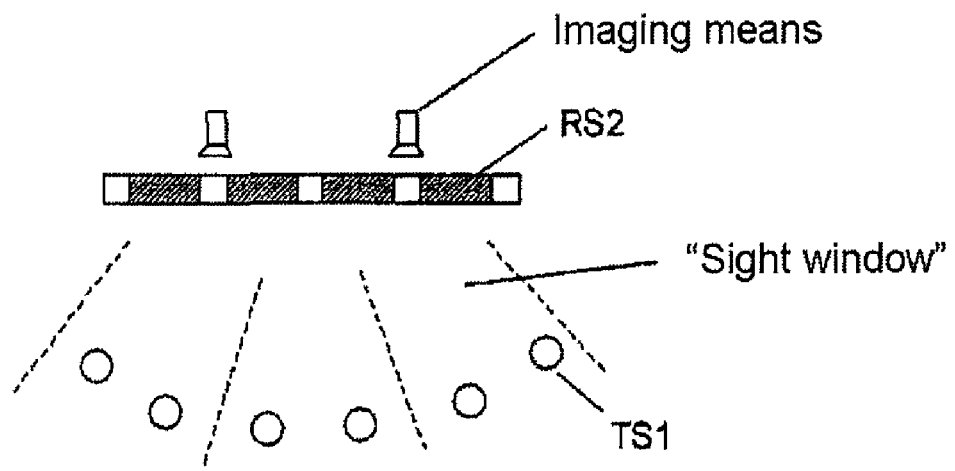
Location2
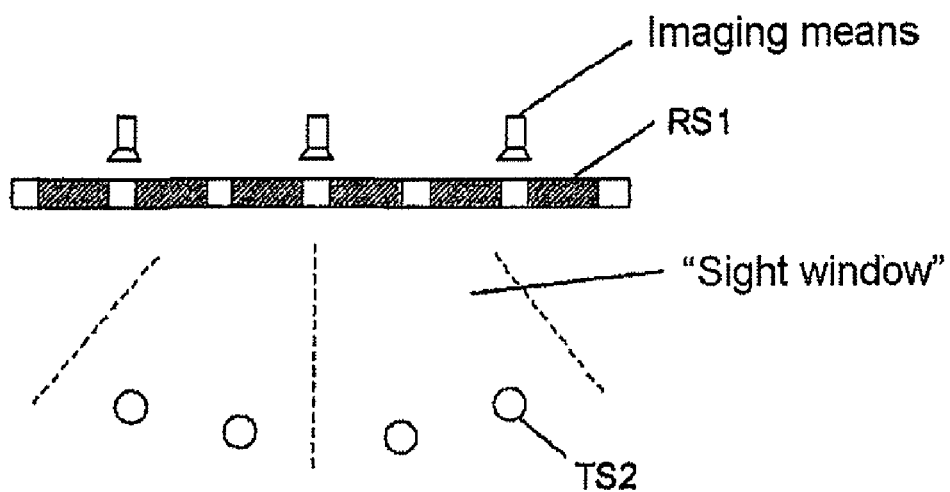

Alternative Location 2

Alternative Location 2

Fig. 8A
Location W
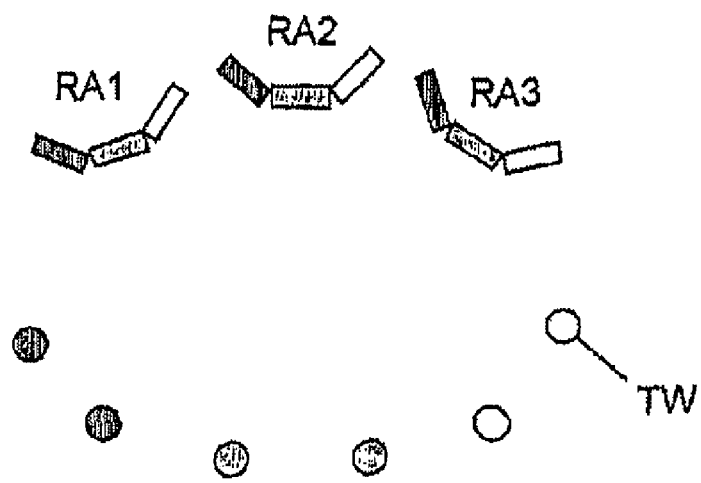
Fig. 8B
Location W
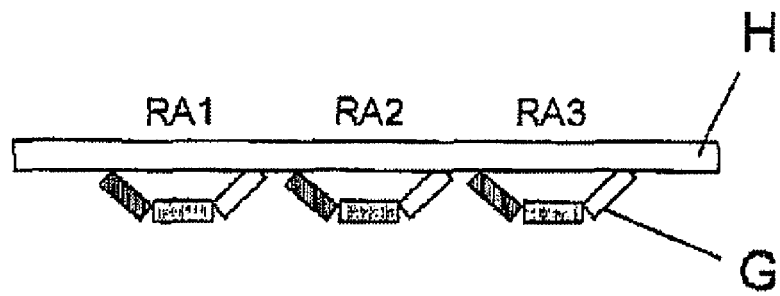
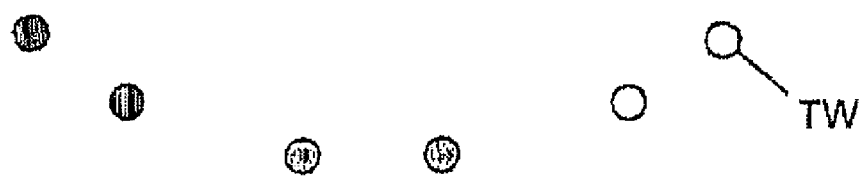

Location W

DEVICE FOR CARRYING OUT A VIDEO CONFERENCE

The invention relates to an assembly for carrying out a video conference between a location A and a location W.

Telephone or video conferences are conducted when personal meetings are ruled out due to the high travel expenses and considerable time involved. However, tests have shown that at least one single personal meeting will promote the development of a business relationship. The closer a telecommunication-based conference comes to a personal meeting, no matter how it is arranged, the more beneficial it will be in terms of the exchange of information and building a personal relationship between the conference participants. Mutual confidence is promoted and negotiations can be conducted more successfully.

Telephone conferences are experienced as inadequate for many reasons because values beyond the spoken word, which are lost in telephone conferences, are transmitted by the personal impression of the opposite number in sound and image. To build up confidence it is advantageous to be able to observe the reactions of the opposite number, including body language.

Normal video conference systems consist of a camera in each of the connected locations and a reproduction screen for each linked location. Depending on the size of the reproduction, it is possible in such systems, to a greater or lesser degree, to detect the reactions, facial expression etc. of the linked participants. However, the conversational atmosphere does not come close to a personal meeting because direct interaction between the participants, by eye-to-eye contact, for example, is not possible. When in the line of sight of the recording camera all the participants in the other location feel as if they are being looked at, but in another line of sight no-one feels as if they are being looked at and therefore addressed. The direct addressing of a particular person is only possible by naming names, but not by eye-to-eye contact. For a video conference with two locations, each with one participant, this may still work, but with several participants it is not possible.

The object of this invention is to provide an assembly for carrying out a video conference that enables an atmosphere to be created which comes as close as possible to an actual meeting and in which eye-to-eye contact or face-to-face contact is possible between at least some of the participants.

The object is achieved according to the invention by an assembly for carrying out a video conference between one location A and at least one location W, at which positions are provided for participants. Here at least 2 image generation means are provided for generating quasi-continuous images of the participants in location A, which are assigned to different participant positions of location W. In addition, at least one optical representation of each participant position of location W is provided in location A.

The image generation means are arranged so that, for at least one participant position in location A and at least two representations of participant positions of location W in location A which are assigned to different image generation means, in the angular range in the horizontal of +20° to the lines of connection between the participant position in location A and the representations of the participant positions of location W in location A that image generation means is arranged which is assigned to the respective participant position in location W.

Moreover, reproduction means are provided in location W for each of the image generation means of location A, the means of reproduction, which reproduces the image of the image generation means to which the participant position is assigned, being in turn assigned to each respective participant position in location W.

This ensures that eye or face-to-face contact is possible at least for the participant positions in location W to which the above conditions apply.

By eye-to-eye contact is meant that a participant of a video conference is able to turn towards another participant in another location so that he or she believes that he or she has eye-to-eye contact with the first participant.

By face-to-face contact is meant that a participant of a video conference is able to turn towards another participant in another location so that he or she believes that the first participant is looking in his or her direction. Tests have shown that it is not absolutely necessary for eye-to-eye contact to be established for this. Instead it is sufficient for a participant to look at the other participant so that it can be detected, together with further criteria, that a particular participant has been addressed. Further criteria may, for example, be the sound direction, the naming of a name or the fact that there is no other person in the vicinity. For example, people feel that they are being looked at and addressed even though the person looking at them is actually looking past them within certain limits when the person being addressed knows that there is no other participant in the direction of speaking of the speaking person.

This invention is explained in the following with reference to different arrangements in which in part all the conference participants are able to make eye-to-eye or face-to-face contact. However, the invention will not be limited to such arrangements. Instead it is also possible to provide arrangements in which only a few selected participants are able to make eye-to-eye or face-to-face contact, whilst the other participants gain the impression of a normal video conference. This may be the case, for example, in negotiations with the presence of interpreters. Here it is important for the negotiating partners to establish eye-to-eye or face-to-face contact in order to provide the best possible basis for discussion. However, the interpreters require no such contact with the opposite number. It is sufficient for them to be able to follow the proceedings as quasi-outsiders and observe the events in the different locations.

In the following statements location A will be the recording location at which images are recorded. These images are then transmitted to reproduction location W, and there reproduced. The assembly according to the invention may be used unidirectional, bidirectional or multidirectional in more than two locations. Here the function of a recording and/or a reproduction location can be assigned to each location.

The participants are able to establish either all eye-to-eye or face-to-face contact or partial eye-to-eye and partial face-to-face contact, depending on the number of image generation means used and therefore the perspectives generated. Further participant positions may also be provided for which no eye-to-eye or face-to-face contact is possible. Here the arrangement of the image generation and reproduction means for these participant positions will not be considered, however.

As already mentioned tests using test persons have shown that they also feel that they are being looked at when a person looks past them at a narrow angle. Thus if a person is in a participant position in location A and directs his or her glance towards the representation of a participant from location W, and if the image generation means is arranged so that it is offset at a small angle in the horizontal, the person who receives the recording from location A at location W still feels that he or she is being looked at.

This technique enables image generation means to be saved and means that a separate perspective need not be generated for each participant in location W. Two participants in location W, to which images of location A are transmitted, and the participants in location A, who are recorded, may be positioned so that only one image generation means is used for the two participants in location W. The arrangement of the participants and of the image generation means must conform to the geometric specifications described above. As a result of this the image generation means is generally arranged between the representations of the participants of location W in location A. A participant of location A, who is looking at the representation of one of the two participants in location W, then looks just past the camera. Both participants in location W have the same image played to them. They would feel that they were being looked at without further information. However, on the basis of further information, e.g. from the knowledge that a further participant is located to the right or left of them, by the naming of a name, directed sound reproduction, other perspective references or based on the general context of the discussion, it will be clear who is meant in the majority of cases. This leads to a situation where this person feels that he or she is being looked at, whilst the other person interprets the glance just past him or her as "not being looked at".

In one embodiment of the assembly according to the invention the image generation means are located in the horizontal angular range from −10° to +10° to the connecting line between a participant position in location A and a representation of a participant position of location W in location A, as defined above. The inner angular range from +3° to −3° may in this case be removed for improved face-to-face contact.

One or more participants may be placed in one participant position. Although in the case of several participants only one assignment of the line of sight to the group is achieved, this may suffice in the discussion context and also corresponds to the situation of a normal, personal discussion in the presence of many people. Moreover, a clear, distinct visual relationship cannot always be established.

In location W are arranged reproduction means with which the images of location A recorded or otherwise generated can be reproduced. Each perspective thus recorded or generated is in this case assigned to one or more participant positions in location W. Each participant in location W will here only see the perspective, i.e. the reproduction which is assigned to his or her position. In this case the possibility of also being able to see some or all of the other reproductions must not be completely ruled out. It is sufficient for the assigned reproduction to be easier to see than the others, e.g. because of a more favourable arrangement, better quality etc. Each participant will automatically look at the reproduction which is best recognisable for him or her. For example, if the participants are positioned along the segment of a circle, and the reproductions are also correspondingly arranged, each participant will naturally tend to look at the reproduction arranged in front of him or her, which he or she is able to look at without turning the head and at an approximate right angle. The fact that he or she can possibly also see other reproductions for which he or which would have to move into an uncomfortable position, and which are further away from him or her, or which can only be seen at an oblique angle, does no harm.

However, the reproduction means may also be screened from each other by suitable measures so that only one reproduction means is actually visible. Such measures may be of a physical nature, e.g. partitions, sight screens or optical lenses such as Fresnel lenses. Polarisation filters or optical filters with angle-dependent viewing windows (e.g. shadow masks, frequency-selective filters, etc.) represent another alternative, these devices being known, for example, from stereoscopic and auto-stereoscopic reproduction means. Such filters allow the multi-channel reproduction of different images on a reproduction means, normally a screen. For several or all participants the reproduction surface is then the same. Any multiple representations of the participants in the other location may therefore be represented in approximately the same position. The different images are then reproduced as a function of the angle of observation, so that although several participants are looking at the same screen, each will see the perspective assigned to him or her.

Reproduction means may, for example, be one or a plurality of normal television or plasma screens or projections. However, they may also be one or a plurality of screens with multi-channel reproduction and corresponding filters. It is particularly advantageous for the images transmitted to show the participants in the other location approximately life size, where approximately 80% of life size is still regarded as true to life. A wall in the location concerned may be used as a reproduction surface for this purpose.

The representations of participant positions may be positioned to create as natural a conference atmosphere as possible by providing a plurality of representations of a participant position of location W in location A, which representations are assigned to different participant positions in location A and are positioned so that the angular ranges about the extended connecting lines between at least two participant positions in location A and the corresponding representations of the participant position in location W, assigned to these participant positions, form an intersection. The image generation means which is assigned to the participant position of location W represented in location A may in this case be arranged within the intersection.

The different representations of a participant position in location W for the different participant positions in location A may also be advantageously generated by multi-channel reproduction and angle-dependent filters. The representations of the participants in the other location may therefore be represented in approximately the same position for the participants in location A, and the above-mentioned intersection condition can therefore be met in a simple and advantageous manner. However, only the representations of the participants in location W assigned to each defined participant position in location A can be seen from that position.

The image generation means with which the participants in location A are recorded may be cameras. In this case an image generation means within the meaning of this patent application may also consist of a plurality of cameras to cover a larger angular range or supply better image quality. This may be achieved by a panoramic arrangement of cameras, or, where the participants are spaced far apart in the recording location or for detailed recordings (e.g. close-up recordings), by suitable arrangement of the cameras whose images are then suitably joined together for the reproduction location. Here it must be ensured that the recording fields of the cameras do not intersect or only intersect at insignificant points. However, it is also possible to produce recordings for reproduction by other means. For example, further perspectives can be produced from a digital recording with a camera by calculation, which considerably reduces the quantity of data to be transmitted from location A to location W. Further perspectives of location A for virtual camera locations can be calculated in location W.

The image generation means can be arranged, real and virtually, offset at a vertical angle of up to 25° upwards and −5° downwards to the line of sight. "Line of sight" refers in this case to the connecting line or plane between the median eye height of the participants in the recording location and the average eye height of the representations of the participants in the reproduction location represented in the recording location. Such a perspective is still experienced as natural and simplifies the recording of the participants in location A. The representations of the participants of the reproduction location and the reproduction means can be arranged at the natural eye height of the participants in the recording location. The image generation means can be positioned within an angular range above or below without colliding with the reproduction means. Small cameras, which can be concealed extremely well, have provided particularly favourable for back projection, if they can be positioned slightly above the eye height represented, i.e. at an angle to the line of sight and consequently outside the essential image section.

The representations of the participants of location W in location A serve as spatial reference points for the participants in location A. They must be able to turn towards a participant in location W in the form of his/her representation in location A. Normally the video conference will take place bidirectionally in both directions, i.e. both locations are simultaneously recording locations A and reproduction locations W. The representations of the participants in the other location are then the transmitted images. In a simpler form, however, a unidirectional conference can be constructed where only the participants in one location see quasi-continuous images of the other location, whilst the representations of these participants in the other location may, for example, be still images. In the simplest case the representations may be simple, unmoved images or any other type of model of the participants which merely ensure that the participants in location A have reference points on which they can focus to look at a participant.

Furthermore, a video conference such as that described above can also be carried out between more than two locations. Here at least one location will transmit to two or more other locations so that eye-to-eye or face-to-face contact is possible, at least unidirectionally. If this applies to all the locations, each location is repeatedly a location A in which images are recorded for the different locations, and repeatedly location W, where the recorded images of a plurality of locations are reproduced.

The angular ranges indicated for all the above cases must be understood to represent approximate outer limits. Whilst there is no longer a clear impression that the discussion participant establishes face-to-face contact where the limits are substantially exceeded, smaller angular ranges may also be defined as limits within these limits.

One special case of the assembly according to the invention is a video conference with only one image generation means in location A. The positions of the representations of the participants of location W in location A and the participant positions in location A are arranged so that the image generation means is arranged in the horizontal angular range from −10° to −3° or from +3° to +10° to the connecting lines between the participant positions in location A and the representations of the participant positions of location W in location A.

It is also possible to arrange the participants in location W, which are assigned to the same image generation means, seated in rows behind one another. Eye-to-eye or face-to-face contact is therefore possible within the same framework as described above, with the establishment of further limitations which this participant arrangement would impose even in a personal meeting. Whether a participant is addressed from the first or the second row is apparent, if not clearly detectable from the line of sight, then from other circumstances which will not always be clear. In this respect, the goal to come as close as possible to a personal meeting is achieved.

The field of vision of an image generation means may be widened by a panoramic arrangement of a plurality of cameras known from the state of the art where there is a plurality of participant positions in the recording location. A stereoscopic camera arrangement for recording three-dimensional images for one or a plurality of image generation means is also possible. In that case the reproduction means must be suitably selected to provide a three-dimensional reproduction.

Further advantageous embodiments are described in the dependent claims.

The invention will be explained in greater detail in the following by means of examples with reference to the attached drawings. The drawings are not to scale and are merely diagrammatic. The angle indications in the text are not necessary reproduced correctly in the figures. It is self-evident that the examples given are only explanatory examples which are not intended to limit the scope of protection of the invention.

FIGS. 1A to D show possible assemblies for seven participant positions in a recording location A and six participant positions in a reproduction location W;

FIG. 3 shows a possible assembly for a video conference between three locations with two times four and one times seven participant positions;

FIG. 4 shows possible assemblies for video conferences with two participant positions in two and three locations respectively;

Figure 6A:
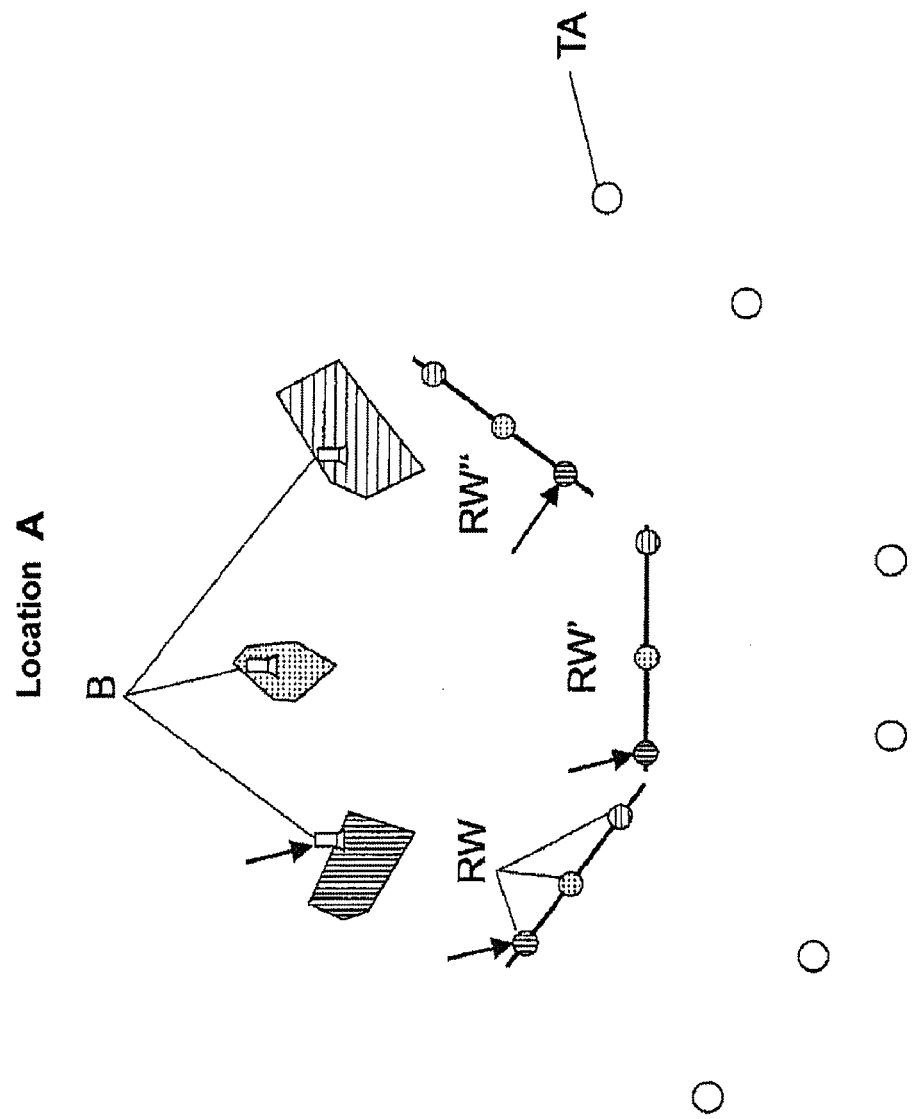
Figure 7B:
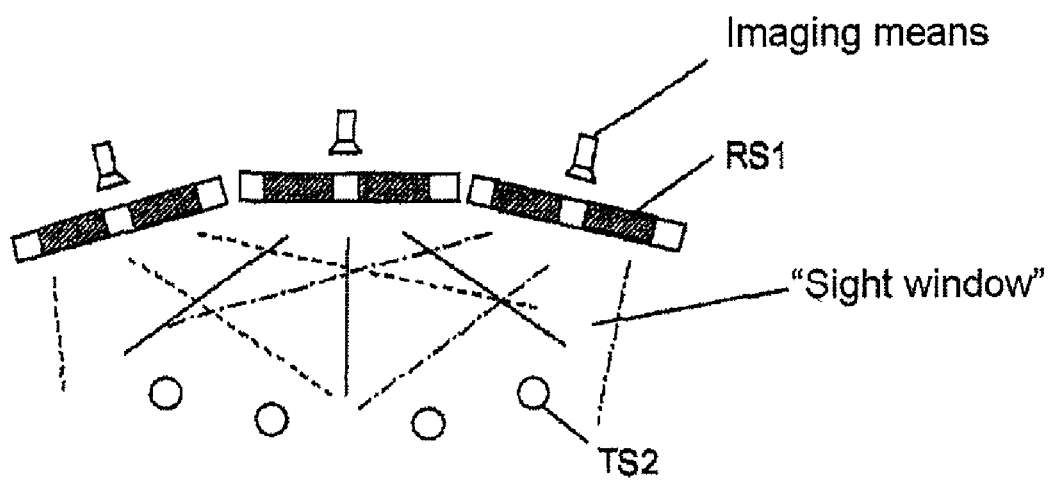
Figure 7C:
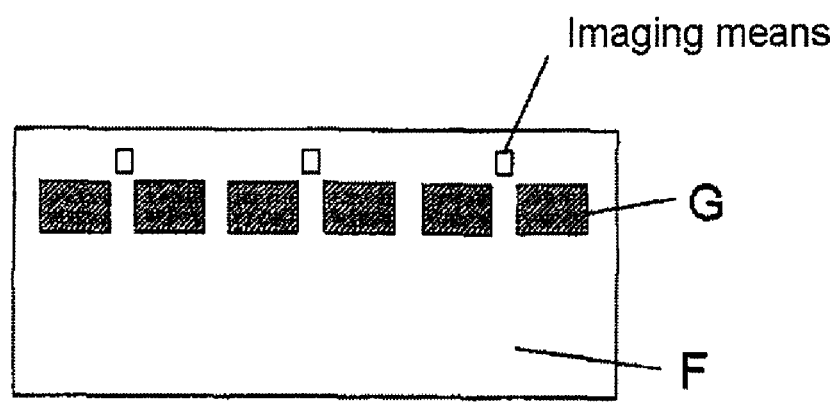
Figure 8C:
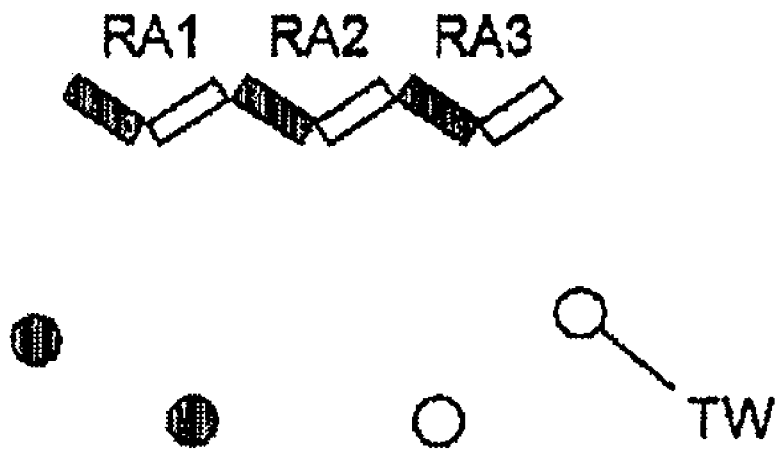

FIGS. 5A and B show the determination of the positions of the image generation means in an assembly with a plurality of representations of each participant of location W in location A;

FIGS. 6A and B show the determination of the image generation means in an assembly with a plurality of representations of each participant of location W in location A in an assembly that differs slightly from FIGS. 5A and B;

FIGS. 7A to C show alternatives of a bidirectional construction using multi-channel reproduction with a filter;

FIGS. 8A to C show different alternatives for reproduction means in location W.

FIG. 1 shows a possible assembly of participant positions and image generation means in location A and two alternative reproduction possibilities in location W.

FIG. 1A shows a recording location A with 7 possible participant positions TA. In the remote location W with which the video conference is to be established there are 6 participants who are represented in location A by representations RW. Cameras K are arranged as image generation means between representations RW. The cameras are in this case each assigned to the two adjacent participant positions in reproduction location W, which are represented in recording location A by the corresponding representations RW. As shown in the example of the central participant position TA, camera K, which is assigned to the participant position of location W associated with representation RW, is located in an angular range from −10° to +10° about the connecting line between participant position TA and the respective representation RW. This applies to all the participant positions between which eye-to-eye or face-to-face contact is to be made possible.

FIG. 1B shows one possibility of reproducing the images in location W recorded in location A. Separate screens B are used as reproduction means for every two participants. One camera is assigned in pairs to a total of participants TW in location W. For example, the left camera in FIG. 1A, whose images are reproduced on the left screen in FIG. 1B, is assigned to the two left participants. The two left participants only see this screen. Although theoretically they can also see the adjacent screen, this possibility is eliminated in practice by distance and the angle of observation.

If the central participant in location A (FIG. 1A) now addresses the participant on the far left in location W, he turns to his/her representation in location A. In doing so he or she is recorded by all three cameras whilst looking just past the camera on the far left assigned to the addressed participant. The other cameras record him or her clearly lateral. The two participants positioned on the left in location W see the image of the left camera. The central participant in location A establishes face-to-face contact with them. Which of the two participants in location W who has been addressed is evident from the further context in the overwhelming number of cases. The central and right pairs of participants in location W see the images recorded with the cameras assigned to them, which show the central participant in location A laterally. To them it is clear that they have not been addressed but the pair of participants sitting to their right on the outside have been addressed.

As an alternative to the assembly shown in FIG. 1B for location W, the assembly shown in FIG. 1C may also be chosen. Here a large screen B is selected for all the participants, on which screen the images recorded with the three cameras are reproduced in parallel in multi-channel reproduction. Due to an angle-selective filter F the left, central and right pair of observers can only see the images of the channel which transmits the images recorded with the camera assigned to them.

Figure 1D:
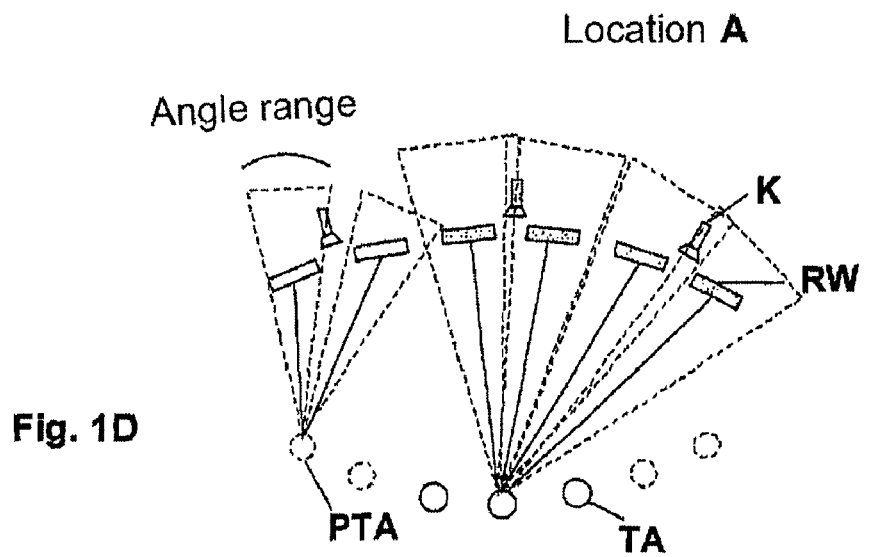

FIG. 1D shows an assembly in recording location A, where there are active participant positions TA and passive participant positions PTA. The active participant positions TA may establish, at least unidirectionally, eye-to-eye or face-to-face contact, according to the equipment in the other location or locations. Passive participant positions PTA may participate in the conference and are also visible in the image in the remote location or locations W provided that camera K is suitably aligned, but they can establish neither eye-to-eye nor face-to-face contact with the participants in the other locations. Such a construction is suitable, for example, when translators or records of minutes are participating in a conference. The actual parties to the discussion are placed in participant positions TA and may establish face-to-face or eye-to-eye contact with the participants in the corresponding positions in the other location or locations. The participants in positions PTA, on the other hand, are only attending the conference and receive all the information required to perform their tasks. Because of their passive participation, the establishment of face-to-face or eye-to-eye contact with the participants in the other locations is not necessary, thus enabling the technical expenditure and quantity of data to be transmitted to be reduced.

Figure 2:
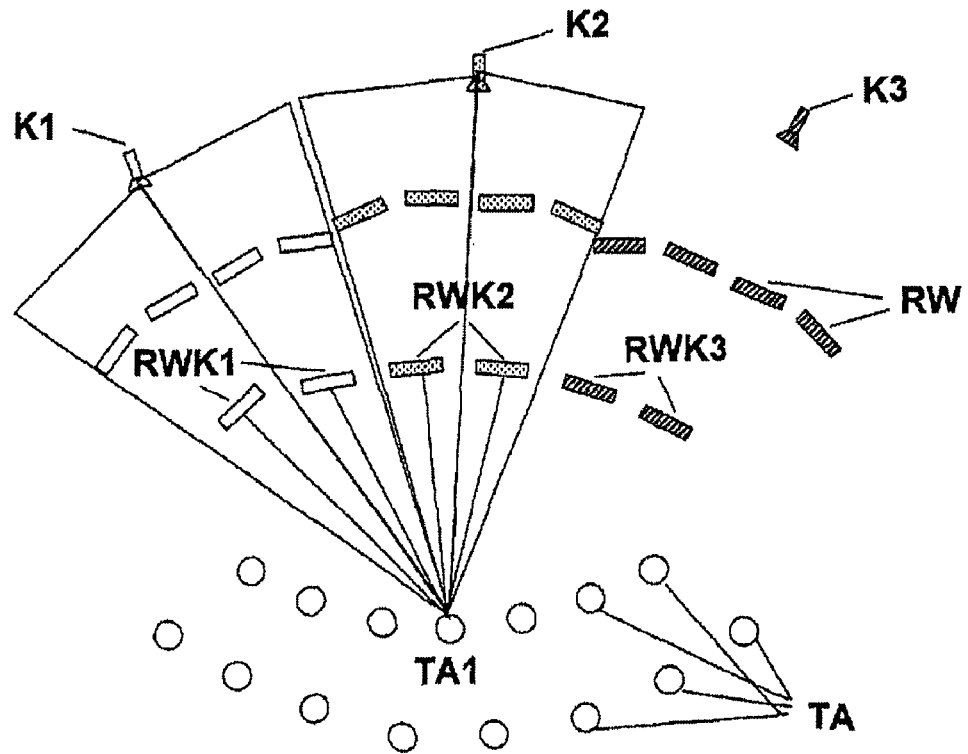
FIG. 2 shows a possible assembly for 15 participant positions on two rows in a recording location A and 18 participant positions in two rows in a reproduction location W.

FIG. 2 shows a possible assembly of participants in location A. Participant positions TA are arranged in two rows. This is also the case in the corresponding location W, so that representations RW of the participants there are also arranged in two rows one behind the other in location A. Furthermore, three image generation means K1, K2 and K3 are arranged in location A. The image generation means record the participants of location A. The image generation means are assigned to certain participant positions in location W, namely in this case to the participants who are represented in location A by representations RWK1, RWK2 and RWK3 on the first row in pairs on the right, in the centre and on the left respectively. Moreover, the image generation means are assigned to the participant positions in the second row in location W, who are represented in location A by the representations shown on the second row. The allocation is reproduced in the figure by the angular ranges shown. For example it is shown, for the central participant TA1 on the first row in location A, that the conditions for face-to-face contact are met. If connecting lines are drawn between participant position TA1 and representations RWK1 and RWK2, it is shown that image generation means K1 and K2, which are assigned to participant positions RWK1 and RWK2 respectively in location W, are each arranged in the horizontal angular range from −20° to +20°. The participants in location W, who are represented in location A by representation RWK1 and RWK2, see the image generated by image generation means K1 and K2 respectively in location W. The participants on the second row in location W, whose representations in location A are arranged in the predetermined angular range behind RWK1 and RWK2, also see the image generated by image generation means K1 and K2 respectively in location W. Face-to-face contact can be established with all the participant positions to which the above conditions apply, i.e. including the participant positions arranged behind RWK1 and RWK2 in the predetermined angular range. As in the case of a personal meeting, it is evident to the participants, from other circumstances, who exactly is being addressed.

FIG. 3 shows a video conference assembly for linking three locations. From the view in location A the representations of 4 participants from two locations W1 and W2 are present in the room. Image generation means K in location A are in turn assigned to the participants in locations W1 and W2, in pairs, so that a total of 4 image generation means K are arranged in location A. The two left image generation means in the figure transmit images to location W1, and the two right image generation means in the figure transmit images to location W2. Face-to-face contact is again possible with the participant positions to which the conditions described above apply. By way of example the connecting line is drawn between the central participant position TA in location A and the participant position on the left outside location W2 and the angular range from −20° to +20° within which the image generation means is arranged that is assigned to the corresponding participant position of the remote location for which face-to-face contact is to be made possible.

FIG. 4 shows assemblies in which only 2 participant positions are provided in each location, one camera being sufficient to record both participants. In FIG. 4A two, and in FIG. 4B three locations are linked together.

FIG. 4A shows in location A two participant positions TA and two representations RW of participants in location W, together with one camera K. For the establishment of face-to-face-contact between all the participants the positions are arranged in such a manner that the camera lies within an angular range of ±10° to the connecting line between each participant position TA in location A and each representation RW, the inner angular range of ±3° being omitted on each occasion.

The same conditions apply to the assembly shown in FIG. 4B as for the assembly shown in FIG. 4A. The two left representations RW1 represent the participants in the corresponding location W1. The camera arranged between them records the images intended for these participants, which are transmitted to location W1. The same applies to the participants in the second corresponding location W2, whose participants are represented in location A by the two right representations RW2. For them the images transmitted from location A are recorded with the camera arranged between representations RW2.

FIG. 5 shows an assembly with six participants in location A and four participants in location W. In location A a plurality of representations RW1 (RW1, RW1', RW1") is provided of the associated participant position of location W. Representations of the four participant positions in location W are assigned in pairs to each of participants TA in location A.

FIG. 5A shows the positioning of cameras C for enabling face-to-face contact between all the participants to be established in such an assembly. During the conference the left pair of participants observe left representations RW1 of the four participants in location W, the central pair of participants observe the central representations RW1', and the right pair of participants observe the right representations RW1". The image generation means consisting of cameras C1, C1' and C1", which is assigned to the left pair of participants in location W, who are represented in location A by representations RWB1, records images of the left, central and right pairs of participants in location A. The recorded images are then combined in location W to representations of the participants of location A so that the pair of participants RWB1 see the six participants TA in the correct order. The same applies to the participants RWB2.

FIG. 5A now shows the arrangement of the cameras so that the images recorded by the different cameras can be combined in such a manner that face-to-face contact can be established between all the participants.

The representations of a participant position in location W (e.g. RW1, RW1' and RW1") are first positioned so that the angular ranges about the extended connecting lines between the assigned participant positions in location A and the representations of the participant position in location W assigned to these participant positions form an intersection. The intersections are represented two-dimensionally in FIG. 5A. In reality, however, they are three-dimensional intersections because, as explained above, angular ranges are predetermined both in the horizontal and vertical directions to meet the conditions for eye-to-eye and face-to-face contact. The cameras must then be arranged inside the intersections.

FIG. 5B shows by way of example, with reference to the left pair of participants in location A, the construction of the intersection. The position of camera C1 from FIG. 5A is to be determined. Camera C1 is assigned to the left pair of participants in location W, which pair is represented for participants TA1 and TA2 by the two left representations RWB1 of the left group of representations in location A. A maximum horizontal angular range ±20° is first drawn from each of participants TA1 and TA2 about the connecting line between the participant positions and the representations. In FIG. 5B the angular ranges about the left of representations RWB1 are drawn in a continuous line, and those about the right of the representations are drawn in a dotted line. The resultant intersection is shown shaded. The corresponding intersection for the position of camera C2 from FIG. 5A, which is assigned to the pair of representations and participants RWB2, is shown in the form of dots. For purposes of better clarity the angular ranges for this pair are not drawn completely.

FIG. 6 shows a similar construction to FIG. 5 for six participants in location A and three participants in location W.

As may be deduced from FIG. 6A, representations of the participants in location W are in turn provided for pairs of participants in location A, i.e. three representations of each participant in location W, combined together to form groups RW, RW' and RW". An image generation means B, which in this case consists of only one camera, is provided for each of the participants in location W. Image generation means B must be arranged in intersections assigned to the representations and participants in location W to allow eye-to-eye or face-to-face contact. For a clearer understanding the intersections are shaded or dotted longitudinally or transversally, as is the associated representation. The representations identified by an arrow in FIG. 6A represent the same participant position in location W for which the camera must be arranged inside the intersection, also identified by an arrow.

Figure 6B:
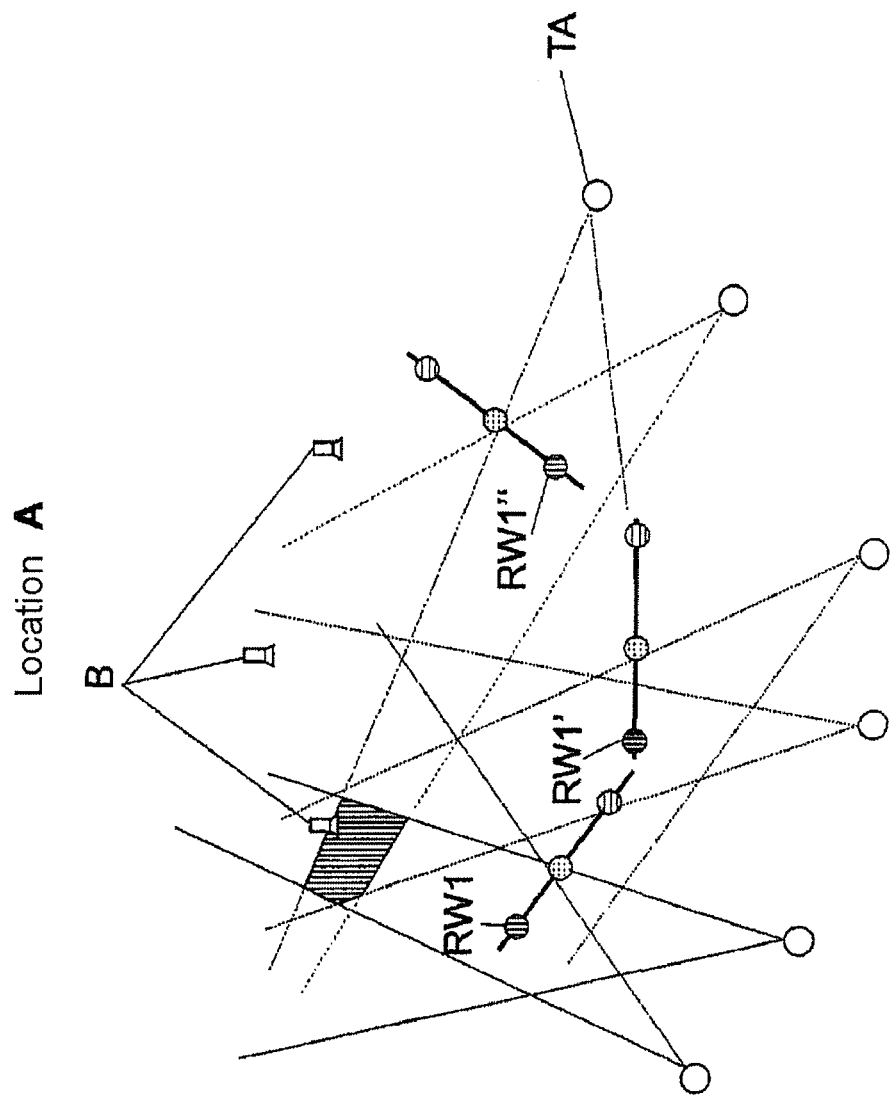

FIG. 6B shows, by way of an example and with reference to the representation identified by an arrow in FIG. 6A, with the associated intersection, the determination of the intersection. A maximum vertical angular range ±20° about the connecting line between participant positions TA and the associated representations is drawn from each of participant positions TA. In FIG. 6B this means that an angular range about the left representation of group RW1" is drawn from the two right participant positions, the range about the left representation of group RW1' is drawn from the two central participant positions, and the range about the left representation of group RW1 is drawn from the two left participant positions. This results in the intersection drawn shaded. In reality this is a three-dimensional intersection because the permissible camera arrangements may be comprised within a maximum horizontal angular range of ±20° and vertical angular range from −5° to +25°. The reference plane for the vertical angular range will in this case be the connecting plane between the central eye height of the participants in the recording location and the average eye height of the representations of the participants in the reproduction location represented in the recording location.

FIG. 7 shows an example of a bidirectional construction using multi-channel reproduction with filters. The use of multi-channel reproduction with a filter is particularly advantageous because it is possible with this technique to arrange a plurality of representations of one and the same participant position in location W in approximately the same spatial position. This method is particularly suitable for the establishment of links with bi- or multidirectional face-to-face and eye-to-eye contact.

FIG. 7A shows the construction of a link with bidirectional face-to-face contact in which screens with multi-channel reproduction and corresponding filters are used for the reproduction means in both locations 1 and 2. Representations RS1 and RS2 of locations 1 and 2 respectively are represented on these reproduction means for participant positions TS1 and TS2 respectively in locations 1 and 2. The individual participant positions TS1 and TS2 see the representations assigned to them through the vision windows generated with the multi-channel reproduction and the corresponding filters. It is possible to use a common screen with multi-channel reproduction and a filter as the reproduction means.

As shown in FIG. 7B for location 2, a plurality of screens with multi-channel reproduction and the corresponding filters may also be used.

A further alternative assembly is shown in FIG. 7C. In order to make possible eye-to-eye or face-to-face contact it is sufficient for faces G of the participants in the remote location to be reproduced with multi-channel reproduction and corresponding filters. On the other hand, the bodies of the remote participants, as also the background of the remote location, may be reproduced, for example, with a simple, normal projection, if possible over the entire surface F. FIG. 7C shows such a possible mixed form of reproduction means, viewed from the front. The transmitted images may show the participants in the location in approximately life size.

A construction according to FIG. 7 may be suitably extended for links with multidirectional face-to-face contact.

FIG. 8 shows further examples of possible arrangements of the reproduction means in location W, where a plurality of screens is used for each transmitted participant in location A or for sub-groups of participants in location A. Here the screens are arranged in such a manner that they can be seen extremely easily by participants TW assigned to them. FIG. 8A shows, for example, three participants or three sub-groups of participants in location A (RA1, RA2 and RA3) on three screens, which are assigned to different participants in location W. The associated allocations are identified by the same filling. FIG. 8B shows a mixed form of reproduction means for the approximately life size representation of transmitted images RA of the participants in location A. Here the bodies of participants RA and background H are represented by simple projection and are the same for all the observers. However, faces G of participants RA are transmitted on different screens for the observing participants in the other location in different perspectives. FIG. 8C shows a further possible arrangement of screens in a row.

The invention claimed is:

1. An assembly for carrying out a video conference between a location A and at least one location W, where positions are provided for participants at each location, comprising
at least two image generation means configured for generating quasi-continuous images of the participants in the location A, each of the at least two image generation means are assigned to a different participant positions in location W,
at least one optical representation of each participant position of location W is provided in location A,
wherein in a horizontal angular range of ±20° about the connecting lines between at least one participant position in location A and at least two representations of different participant positions of location W in location A which are assigned to different image generation means, that image generation means is placed which is assigned to the participant position in location W,
reproduction means are provided in location W for each of the image generation means in location A, wherein the reproduction means which reproduces the image of the image generation means to which the participant position is assigned, is in turn assigned to each respective participant position in location W.

2. The assembly according to claim 1, characterized in that in the horizontal angular range from −10° to −3° or from +3° to +10° about the connecting lines between at least one of the at least one participant position in location A
and at least two representations of different participant positions of location W in location A which are assigned to different image generation means, that image generation means is placed which is assigned to the participant position in location W.

3. An assembly for carrying out a video conference between a location A and a location W, where positions are provided for participants,
wherein at least one image generation means configured for generating quasi-continuous images of the participants in the location A and at least one optical representation of each participant position of location W is provided in location A,
wherein an image generation means of location A is assigned to each of these participant positions in location W,
wherein in the horizontal angular range from −10° to −3° or from +3° to +10° about the connecting lines between at least one participant position in location A and at least two representations of different participant positions of location W in location A, that image generation means is placed which is assigned to the participant position in location W,
reproduction means are provided in location W for each of the image generation means in location A, wherein the reproduction means, which reproduces the image of the image generation means to which the participant position is assigned, is in turn assigned to each respective participant position in location W.

4. The assembly according to claim 1, characterized in that one or a plurality of participants may be placed in each participant position.

5. The assembly according to claim 1, characterized in that only one reproduction means or one reproduction means viewable with a better quality than the other reproduction means, can be observed from each participant position.

6. The assembly according to claim 1, characterized in that the image production means generate images of a perspective at an angle of −5° to +25° vertically to the line of sight.

7. The assembly according to claim 1, characterized in that a
plurality of representations of a participant position of location W is provided in location A, which representations are assigned to different participant positions in location A, and are positioned in such a manner that the angular ranges about the extended connecting lines between at least two participant positions of location A and the representations of the participant position of location W assigned to these participant positions form an intersection.

8. The assembly according to claim 7, characterized in that the image generation means, which is assigned to the participant position of location W represented in location A, is arranged inside the intersection.

9. The assembly according to claim 1, characterized in that at least one image generation means is a camera.

10. The assembly according to claim 1, characterized in that the image of at least one image generation means is produced by calculation and in that the position of the image generation means in location A is virtual.

11. The assembly according to claim 1, characterized in that the reproduction means are one or more screens with multi-channel reproduction.

12. The assembly according to claim 11, characterized in that the multi-channel reproduction takes place with a filter, in particular with a polarization filter and/or optical filter with an angle-dependent sight window and/or shadow mask and/or frequency-selective filter.

13. The assembly according to claim 1, characterized in that first reproduction means are provided which reproduce the faces of the participants in location A and are assigned to the participant positions in location W, and second reproduction means reproduce the bodies of the participants in location A and/or the background in location A, and have no assignment to the participant positions in location W.

14. The assembly according to claim 1, wherein the horizontal range is ±10°.

15. The assembly according to claim 1, wherein the image production means generate images of a perspective at an angle between +9° and +15° vertically to the line of sight.

* * * * *